United States Patent
Kawamoto et al.

(10) Patent No.: US 7,437,877 B2
(45) Date of Patent: Oct. 21, 2008

(54) COMPRESSOR HAVING LOW-PRESSURE AND HIGH-PRESSURE COMPRESSOR OPERATING AT OPTIMUM RATIO BETWEEN PRESSURE RATIOS THEREOF AND GAS TURBINE ENGINE ADOPTING THE SAME

(75) Inventors: Osamu Kawamoto, Saitama (JP); Mineyasu Oana, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 609 days.

(21) Appl. No.: 11/055,076

(22) Filed: Feb. 11, 2005

(65) Prior Publication Data

US 2005/0178105 A1 Aug. 18, 2005

(30) Foreign Application Priority Data

Feb. 13, 2004 (JP) .............................. 2004-037292

(51) Int. Cl.
*F02C 3/10* (2006.01)
*F02C 6/00* (2006.01)

(52) U.S. Cl. ...................... 60/791; 415/199.6; 60/226.1

(58) Field of Classification Search ................ 60/226.1, 60/262, 791, 792; 415/199.6, 143, 181
See application file for complete search history.

(56) References Cited

U.S. PATENT DOCUMENTS

| | | | | |
|---|---|---|---|---|
| 2,563,270 A | * | 8/1951 | Price | ........................... 60/242 |
| 2,640,319 A | * | 6/1953 | Wislicenus | .................... 60/726 |
| 2,726,508 A | * | 12/1955 | Halford et al. | ................ 60/268 |
| 2,746,246 A | * | 5/1956 | Valota | ........................ 60/791 |
| 2,748,564 A | * | 6/1956 | Marchal et al. | ............... 60/248 |
| 3,357,176 A | * | 12/1967 | Williams | ..................... 60/792 |
| 3,814,549 A | * | 6/1974 | Cronstedt | .................... 417/406 |
| 3,971,208 A | * | 7/1976 | Schwent | ...................... 60/773 |
| 4,141,212 A | * | 2/1979 | Koschier | ..................... 60/792 |
| 4,651,521 A | * | 3/1987 | Ossi | ......................... 60/226.3 |
| 4,791,784 A | * | 12/1988 | Minardi et al. | ................ 60/262 |
| 6,055,805 A | * | 5/2000 | El-Aini et al. | ............. 60/226.1 |
| 6,195,983 B1 | * | 3/2001 | Wadia et al. | ............... 60/226.1 |
| 6,205,771 B1 | * | 3/2001 | Rowe | ........................ 60/226.1 |
| 6,488,469 B1 | * | 12/2002 | Youssef et al. | ............. 415/143 |
| 6,494,032 B2 | * | 12/2002 | Udall et al. | ................... 60/223 |
| 7,246,482 B2 | * | 7/2007 | Mahoney et al. | ............. 60/204 |
| 7,266,941 B2 | * | 9/2007 | Eleftheriou et al. | ........ 60/226.1 |
| 2004/0009060 A1 | * | 1/2004 | Romani et al. | ............. 415/143 |
| 2006/0196164 A1 | * | 9/2006 | Donohue | ................... 60/226.1 |
| 2006/0288687 A1 | * | 12/2006 | Bruno et al. | ............... 60/226.1 |

FOREIGN PATENT DOCUMENTS

JP 2001-342995 12/2001

* cited by examiner

*Primary Examiner*—William H Rodríguez
(74) *Attorney, Agent, or Firm*—Squire, Sanders & Dempsey

(57) ABSTRACT

A compressor having a front fan, which rotates to compress intake air, a single-stage low-pressure compressor which is disposed behind the front fan to compress intake air, and a single-stage high-pressure compressor which compresses the compressed air compressed by the low-pressure compressor; a ratio ($R_H/R_L$) of a pressure ratio ($R_H$) of the high-pressure compressor to a pressure ratio ($R_L$) of the low-pressure compressor is within a range of 4.5 to 6.0.

20 Claims, 2 Drawing Sheets

COMPRESSOR HAVING LOW-PRESSURE AND HIGH-PRESSURE COMPRESSOR OPERATING AT OPTIMUM RATIO BETWEEN PRESSURE RATIOS THEREOF AND GAS TURBINE ENGINE ADOPTING THE SAME

BACKGROUND OF THE INVENTION

1. Field of the Invention

The present invention relates to a compressor and a gas turbine engine adopting this compressor. More specifically, the present invention relates to a compressor, which has a single-stage low-pressure compressor and a single-stage high-pressure compressor, and which provides an operational stability throughout its wide operating range, and further relates to a gas turbine engine adopting this compressor.

2. Description of Relevant Art

A gas turbine engine normally comprises a compressor, a combustion chamber, and a turbine. In this gas turbine engine, intake air is compressed by the compressor and is supplied, as compressed air, to the combustion chamber positioned behind the compressor. Then, the injection of a fuel into the compressed air within the combustion chamber provides combustion. The turbine positions behind the combustion chamber and rotates together with the compressor.

In these kinds of the gas turbine engine, the high thermal efficiency is achieved by increasing the pressure of the compressed air to be supplied to the combustion chamber.

Due to an aerodynamic limit in the pressure ratio (the ratio of the outlet pressure of the compressor to the inlet pressure of the compressor) per single-stage, in the compressor adopted in the gas turbine engine, the pressure of the compressed air is gradually increased using a multistage compressor (blade).

When the multistage compressor is adopted, however, total length of the gas turbine engine becomes long, and the weight and size of the engine become large. Additionally, the adoption of the multistage compressor increases the number of parts and requires the excess cost for manufacturing and for managing and checking of parts.

The applicant of the present invention has developed a gas turbine engine which provides a high pressure ratio using only a small number of compressors.

Such a gas turbine engine has been provided by the progress in a fluid analysis technique using a computer and by the progress of raw materials.

As an example of these kinds of the gas turbine engine, the gas turbine engine disclosed in Japanese unexamined patent publication No. 2001-342995 has been discovered. The gas turbine engine disclosed in this patent publication has a front fan, a single-stage low-pressure compressor, and a single-stage high-pressure compressor.

In the case of the gas turbine engine of this kinds, especially in the case of the gas turbine engine which has a two-stage type compressor, the complicated operation control is required in order to achieve an operational stability throughout its wide operating range (from low power output to high power output).

For example, in this kind of the gas turbine engine, an appropriate air bleeding is performed in the middle of the compressor in compliance with the operation condition of the gas turbine engine, or the angle of the blade is adjusted along the flow of air by adopting the compressor in which the direction of stator vane (blade) is adjustable.

Therefore, a compressor, which has a single-stage low-pressure compressor and a single-stage high-pressure compressor and which can provide an operational stability without a complicated operation-control, has been required. Also, a gas turbine engine adopting this compressor has been required.

SUMMARY OF THE INVENTION

The present invention relates to a compressor which has a front fan, a single-stage low-pressure compressor, and a single-stage high-pressure compressor. In this compressor, intake air suctioned by the rotation of the front fan is compressed by the front fan. Then, the intake air is compressed in the single-stage low-pressure compressor (low-pressure compressor) disposed behind the front fan and is supplied, as compressed air, to the single-stage high-pressure compressor (high-pressure compressor). Further, the air compressed in the single-stage low-pressure compressor is further compressed in the single-stage high-pressure compressor. In this compressor, a ratio ($R_H/R_L$) of a pressure ratio ($R_H$) of the high-pressure compressor to a pressure ratio ($R_L$) of the low-pressure compressor is within a range of 4.5 to 6.0.

By controlling the ratio ($R_H/R_L$) of the pressure ratio ($R_H$) of the high-pressure compressor to the pressure ratio ($R_L$) of the low-pressure compressor within such range, the predicted (designed) pressure ratio of respective compressors (the high-pressure compressor and low-pressure compressor) can be brought out. Additionally, the compressor provides an operational stability throughout its wide operating range (from low power output to high power output) without a complicated operation-control.

Here, the pressure ratio of the compressor varies depending on the operation condition. This operation condition is the condition where a rated output is obtained from the apparatus. In case of the compressor adopted in gas turbine engine for an aircraft, for example, the operation condition means the condition where the gas turbine engine is operating under a cruise condition.

Here, the sufficient compression efficiency can not be obtained when a relative pressure ratio ($R_H/R_L$) is below 4.5 or exceeds 6.0. Additionally, the margin against the surge limit (surge margin) drops rapidly when the relative pressure ratio ($R_H/R_L$) is below 4.5 or exceeds 6.0.

In the present invention, it is preferable that the high-pressure compressor is a centrifugal type compressor, and that the low-pressure compressor is an axial-flow type compressor.

In the compressor of the present invention, it is preferable that the ratio ($R_F/R_L$) of pressure ratio ($R_F$) of the front fan to the pressure ratio ($R_L$) of the low-pressure compressor is within a range of 1.1 to 1.6.

Furthermore, it is preferable that the pressure ratio ($R_L$) of the low-pressure compressor is within a range of 1.1 to 2.0, that the pressure ratio ($R_H$) of the high-pressure compressor is within a range of 4.0 to 10.0, and that the pressure ratio ($R_F$) of the front fan is within a range of 1.2 to 2.5.

The present invention relates to a gas turbine engine which has an above described compressor, a combustion chamber, a high-pressure turbine, and a low-pressure turbine.

In the combustion chamber of the gas turbine engine, a fuel is injected to the air compressed by the high-pressure compressor to provide combustion. The high-pressure turbine connects with the high-pressure compressor and is rotated by a combustion gas ejected from the combustion chamber. The low-pressure turbine connects with the low-pressure compressor and the front fan, and which is rotated by a combustion gas ejected from the combustion chamber.

0009

According to the compressor or gas turbine engine of the present invention, the compressor (or the gas turbine engine) provides an operational stability throughout its wide operating range (from low power output to high power output) without a complicated operation-control.

DETAILED DESCRIPTION OF THE PREFERRED EMBODIMENT

A preferred embodiment of the present invention will be described with reference to the attached drawings.

Figure 1:
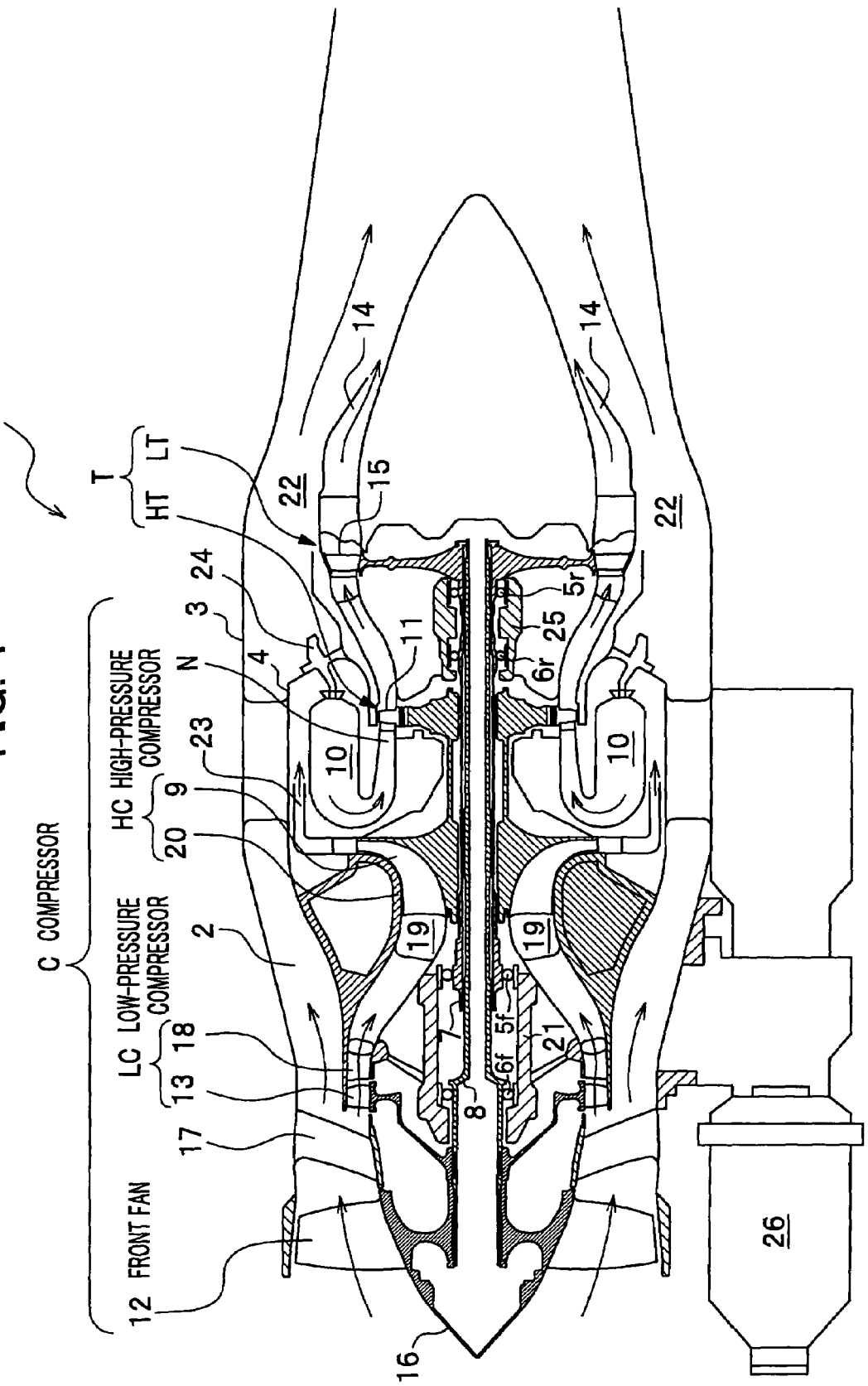
FIG. 1 is a sectional view of the compressor of the present embodiment and the gas turbine engine adopting this compressor.

FIG. 1 is a sectional view of the compressor of the present embodiment and the gas turbine engine adopting this compressor.

A gas turbine engine 1 of the present embodiment is what is called a turbofan engine. This gas turbine engine 1 includes a compressor C, a combustion chamber 10, and a turbine T. The compressor C is composed of a front fan 12 disposed in the forefront of the gas turbine engine 1, a single-stage low-pressure compressor LC (low-pressure compressor LC), and a single-stage high-pressure compressor HC (high-pressure compressor HC). The combustion chamber 10 provides a fuel combustion by mixing fuel with the compressed air supplied from the compressor C. The turbine T is rotated by a combustion gas which is produced by a fuel combustion and is expelled from the combustion chamber 10.

Each component of this gas turbine engine 1 is disposed inside of an outer-casing 3 and an inner-casing 4, which are interconnected through a strut 2 and are arranged co-axially with respect to one another. Here, the outer-casing 3 and the inner-casing 4 respectively have a cylindrical shape.

A cylindrical shaped outer shaft 7 is disposed on the axis of the inner-casing 4, and an inner shaft 8 is inserted into the outer shaft 7 and goes through the outer shaft 7.

The outer shaft 7 is supported by the inner-casing 4 through bearings 5f and 5r. The inner shaft 8 is also supported at fore-side and rear-side with respect to the outer shaft 7 by the inner-casing 4 through bearings 6f and 6r.

The outer shaft 7 is united at the fore-side thereof with an impeller-wheel 9 of the high-pressure compressor HC, and is united at the rear-side thereof with an turbine wheel 11, which composes a rotor blade of a high-pressure turbine HT adjacent to a nozzle N of the combustion chamber 10. In this embodiment, the high-pressure compressor HC is a centrifugal type compressor.

The inner shaft 8 is united at the fore-end thereof with the front fan 12, and is united at the rear-side thereof with a compressor wheel 13, which composes the rotor blade of the low-pressure compressor LC. In this embodiment, the low-pressure compressor LC is an axial-flow type compressor.

Additionally, the inner shaft 8 is united at rear-end thereof with a turbine wheel 15, which composes the rotor blade of a low-pressure turbine LT. Here, this rotor blade is positioned within an ejection duct 14 of a combustion gas A nose cone 16 is disposed at the center of the front fan 12. A stator vane 17 is disposed behind the front fan 12 and connects with inner circumference of the outer-casing 3 at outer periphery thereof.

A stator vane 18 of the low-pressure compressor LC is disposed at inner circumference in a fore-end of the inner-casing 4.

A suction duct 19 and an impeller casing 20 adjacent to the suction duct 19 are formed behind the stator vane 18. The suction duct 19 feeds the air, which was suctioned by the front fan 12 and was compressed to a certain level by the low-pressure compressor LC, to the high-pressure compressor HC.

A bearing housing 21, which stores bearings 5f and 6f supporting the fore-end of the outer shaft 7 and inner shaft 8, respectively, connects with the inside of the suction duct 19.

A part of the air suctioned by the front fan 12 is supplied to the high-pressure compressor HC through the low-pressure compressor LC.

The remainder of the suctioned air, which flows at comparatively low speed and is large in amount, is ejected rearward from a by-pass duct 22 formed between the outer-casing 3 and the inner-casing 4, and serves as a major thrust in low-speed region.

A diffuser 23 positioned at the outside of the outlet of the high-pressure compressor HC connects with the high-pressure compressor HC, and is adapted to supply the high pressure air into the combustion chamber 10 disposed behind the diffuser 23.

In the combustion chamber 10, the fuel, which is injected from a fuel injection nozzle 24 disposed behind the combustion chamber 10, is mixed with the high pressure air supplied from the diffuser 23 to provide combustion.

Then, a combustion gas generated by combustion (a fuel combustion) is ejected to the atmosphere through an ejection duct 14 and a nozzle N directed rearward. This ejection of the combustion gas serves as a major thrust in high-speed region.

A bearing housing 25, which stores bearings 5r and 6r supporting the rear-side of the inner shaft 8 and outer shaft 7, is connected to the inner periphery of the ejection duct 14.

The outer shaft 7 of the gas turbine engine 1 connects with an output axis of a starter motor 26 through a gear system (not shown).

When the starter motor 26 is turned on, the impeller-wheel 9 of the high-pressure compressor HC is actuated (rotated) together with the outer shaft 7, and high pressure air is supplied to the combustion chamber 10.

Then, the high pressure air is mixed with a fuel and is combusted to produce a combustion gas. Thus, the turbine wheel 11 of the high-pressure turbine HT and the turbine wheel 15 of the low-pressure turbine LT are activated (rotated) by the ejection pressure of a combustion gas.

The impeller-wheel 9 of the high-pressure compressor HC is activated (rotated) by a torque of the turbine wheel 11. The front fan 12 and the compressor wheel 13 of the low-pressure compressor LC are activated (rotated) by a torque of the turbine wheel 15.

Then, when the turbine wheel 11 and the turbine wheel 15 are activated (rotated) by the ejection pressure of a combustion gas, the gas turbine engine 1 continues to rotate in the condition that is determined depending on self-feedback balance between the amount of fuel supply and the amount of the air intake.

According to the gas turbine engine 1 and the compressor C which comprises the front fan 12, the single-stage low-pressure compressor LC and a single-stage high-pressure compressor HC, in the present embodiment, an operational stability throughout its wide operating range can be provided by establishing the relation between the pressure ratio of the high-pressure compressor HC and the pressure ratio of the low-pressure compressor LC to a certain relation.

Here, suppose $R_L$ denotes the pressure ratio of the low-pressure compressor LC and RH denotes the pressure ratio of the high-pressure compressor HC, respectively. In the present embodiment, it is preferable that the relative pressure ratio ($R_H/R_L$) is established within a range of 4.5 to 6.0 ($4.5<R_H/R_L<6.0$), specifically within a range of 5.0 to 5.5 ($5.0<R_{H/RL}<5.5$).

Here, the benefits to be obtained by establishing the relative pressure ratio to the foregoing range will be explained with reference to FIG. 2 and FIG. 3.

Figure 2:
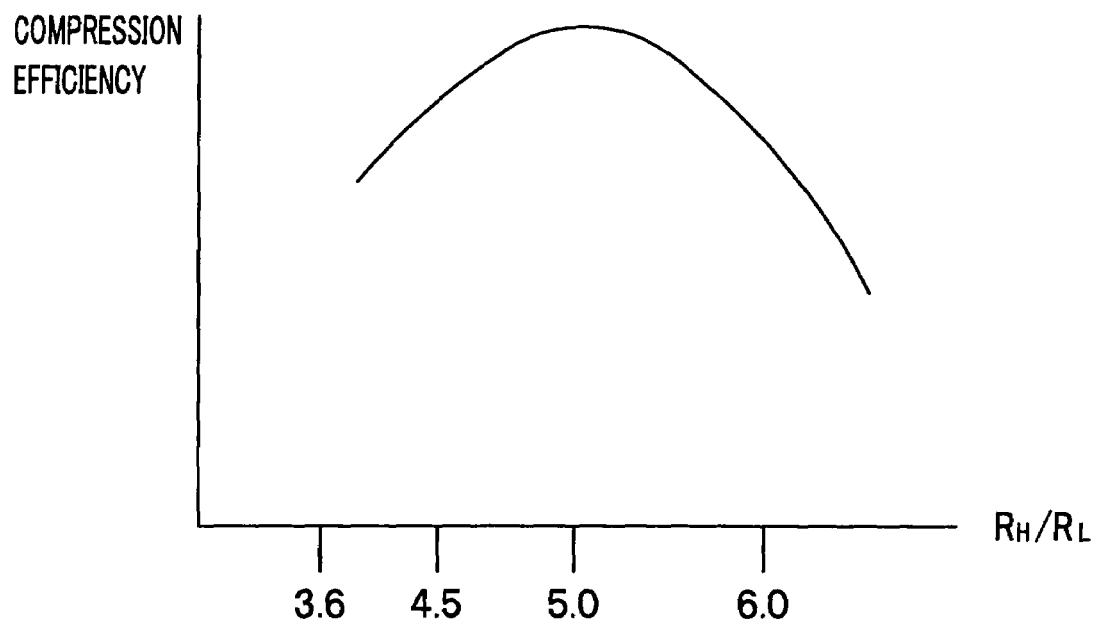
FIG. 2 is a graph showing the relation between the relative pressure ratio ($R_H/R_L$) and the compression efficiency.

FIG. 2 is a graph showing the relation between the relative pressure ratio ($R_H/R_L$) and the compression efficiency. FIG. 3 is a graph showing the relation between the relative pressure ratio ($R_H/R_L$) and the surge margin.

Here, the compression efficiency of FIG. 2 means the achievement level of the pressure ratio, which is simulated on computer, against the total pressure ratio ($R_F \times R_H \times R_L$), which is obtained by multiplying each pressure ratio ($R_F$, $R_H$, and $R_L$) of the front fan 12, the low-pressure compressor LC, and the high-pressure compressor HC.

That is, if the compression efficiency is a high value, this means that each compressor (the front fan 12, the low-pressure compressor LC, and the high-pressure compressor HC) brings their performance sufficiently.

Here, the simulation was performed on the assumption that the gas turbine engine 1 is operated under the cruise condition. That is, the output of the gas turbine engine 1 is 25% of the maximum power output.

As shown in FIG. 2, the compressor C of the present embodiment achieves the highest compression efficiency when the relative pressure ratio ($R_H/R_L$) is in a vicinity of 5.0. The compression efficiency drops rapidly when the relative pressure ratio ($R_H/R_L$) is below 4.5.

This is because when the pressure ratio of the axial-flow type compressor (low-pressure compressor LC) is set at a high value, the degree of the occurrence of a separation of air on the surface of the rotor blade (wing) rises rapidly.

When the relative pressure ratio ($R_H/R_L$) exceeds 6.0, the compression efficiency drops. This is because a separation of air on the surface of the rotor blade (wing) of the high-pressure compressor HC easily arises.

In the above described compressor, it is preferable that the ratio of pressure ratio $R_F$ of the front fan 12 to the pressure ratio $R_L$ of the low-pressure compressor LC is within a range of 1.1 to 1.6 ($1.1<R_F/R_L<1.6$). That is, it is preferable that the ratio ($R_F/R_L$) is between 1.1 and 1.6.

By limiting the ratio within forgoing range, total pressure ratio can be determined at high while securing the operational stability, and the fuel efficiency of the gas turbine engine 1 can be improved.

Here, it is possible to set the relative pressure ratio ($R_H/R_L$) below 4.5 by enlarging the pressure ratio $R_F$ of the front fan 12. But, in this case, since a separation of air on the surface of the rotor blade (wing) becomes problematic if the pressure ratio $R_F$ of the front fan 12 exceeds 2.5; to set the relative pressure ratio ($R_H/R_L$) below 4.5 is not acceptable.

Figure 3:
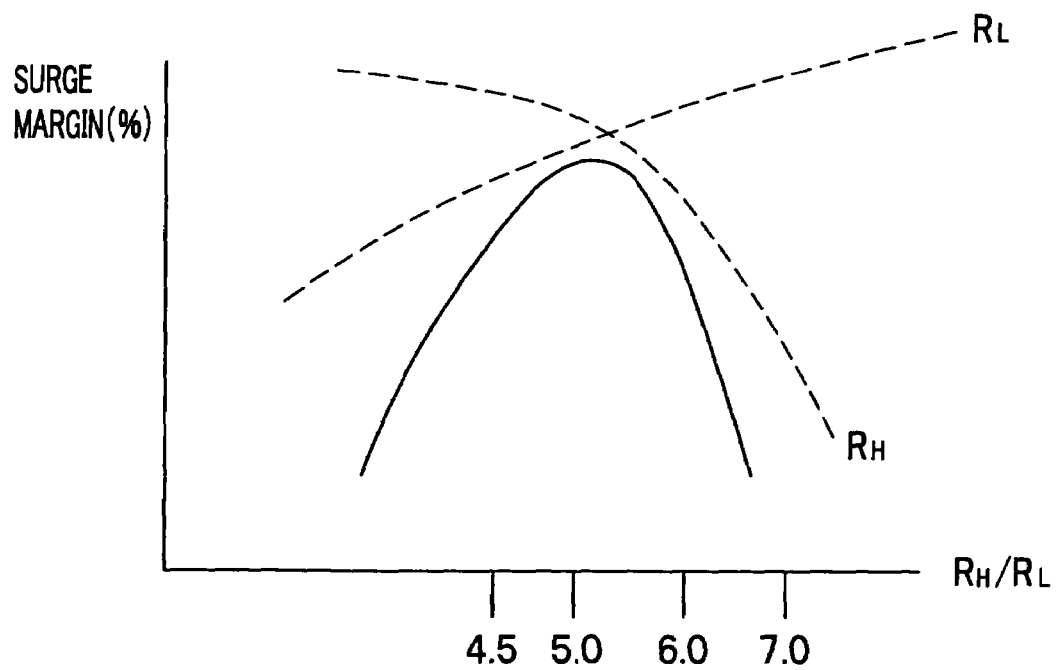
FIG. 3 is a graph showing the relation between the relative pressure ratio ($R_H/R_L$) and the surge margin.

The surge margin of FIG. 3 denotes the margin against the surge limit in the form of percentage.

When the surge margin of FIG. 3 is computed, the value of the $R_H$ and $R_L$ are varied while keeping at a constant value the pressure ratio of the front fan 12 and the total pressure ratio ($R_F \cdot R_H \cdot R_L$), which is obtained by multiplying each pressure ratio ($R_F$, $R_H$, $R_L$) together. Here, $R_F$ denotes the pressure ratio of the front fan 12, $R_L$ denotes the pressure ratio of the low-pressure compressor LC, and $R_H$ denotes the pressure ratio of the high-pressure compressor HC.

Here, the simulation was performed, as well as the case of FIG. 2, on the assumption that the gas turbine engine 1 is operated under the cruise condition.

As shown in FIG. 3, the compressor C of the present embodiment achieves the highest surge margin when the relative pressure ratio ($R_H/R_L$) is in the vicinity of 5.3. The surge margin drops rapidly when the relative pressure ratio ($R_H/R_L$) is below 4.5. This is because the degree of the occurrence of the separation of air on the surface of the rotor blade (wing) of the low-pressure compressor LC rises rapidly.

When the relative pressure ratio ($R_H/R_L$) exceeds 6.0, the surge margin drops. This is because a separation of air on the surface of the wing of the high-pressure compressor HC easily arises.

By limiting the relative pressure ratio ($R_H/R_L$) in a range of 4.5 to 6.0, since effective compression efficiency and high surge margin can be obtained, the gas turbine engine 1 achieves an operational stability. Here, if the relative pressure ratio ($R_H/R_L$) is limited within 5.0 to 5.5, the gas turbine engine 1 achieves more sufficient operational stability.

Although there have been disclosed what are the patent embodiment of the invention, it will be understood by person skilled in the art that variations and modifications may be made thereto without departing from the scope of the invention, which is indicated by the appended claims.

EXAMPLE

In addition to the simulation, an actual measurement was performed under the condition as well as the above described condition, and the result as shown in Table 1 has been obtained.

According to this table, the gas turbine engine 1 has achieved an operational stability without requiring the control of the air bleeding and the variable wing irrespective of the cruise or take-off operation.

0030

TABLE 1

|  | CRUISE CONDITION (simulated value) | CRUISE CONDITION (actual value) | TAKE-OFF CONDITION (simulated value) |
| --- | --- | --- | --- |
| $R_F/R_L$ | 1.33 | 1.30 | 1.24 |
| $R_H/R_L$ | 5.30 | 5.05 | 4.96 |

What is claimed is;

1. A compressor comprising:
    a front fan which rotates to compress intake air;
    a single-stage low-pressure compressor which is disposed behind the front fan to compress intake air; and
    a single-stage high-pressure compressor which compresses the air compressed by the low-pressure compressor; wherein
    a ratio ($R_H/R_L$) of a pressure ratio ($R_H$) of the high-pressure compressor to a pressure ratio ($R_L$) of the low-pressure compressor is within a range of 4.5 to 6.0.

2. A compressor according to claim 1, wherein the high-pressure compressor is a centrifugal type compressor, and the low-pressure compressor is an axial-flow type compressor.

3. A compressor according to claim 1, wherein
    a ratio ($R_F/R_L$) of a pressure ratio ($R_F$) of the front fan to the pressure ratio ($R_L$) of the low-pressure compressor is within a range of 1.1 to 1.6.

4. A compressor according to claim 2, wherein
    a ratio ($R_F/R_L$) of a pressure ratio ($R_F$) of the front fan to the pressure ratio ($R_L$) of the low-pressure compressor is within a range of 1.1 to 1.6.

5. A compressor according to claim 1, wherein
    the pressure ratio ($R_H$) of the high-pressure compressor is within a range of 4.0 to 10.0.

6. A compressor according to claim 2, wherein
the pressure ratio ($R_H$) of the high-pressure compressor is within a range of 4.0 to 10.0.

7. A compressor according to claim 3, wherein
the pressure ratio ($R_H$) of the high-pressure compressor is within a range of 4.0 to 10.0.

8. A compressor according to claim 4, wherein
the pressure ratio ($R_H$) of the high-pressure compressor is within a range of 4.0 to 10.0.

9. A compressor according to claim 1, wherein
the pressure ratio ($R_L$) of the low-pressure compressor is within a range of 1.1 to 2.0.

10. A compressor according to claim 2, wherein
the pressure ratio ($R_L$) of the low-pressure compressor is within a range of 1.1 to 2.0.

11. A compressor according to claim 3, wherein
the pressure ratio ($R_L$) of the low-pressure compressor is within a range of 1.1 to 2.0.

12. A compressor according to claim 5, wherein
the pressure ratio ($R_L$) of the low-pressure compressor is within a range of 1.1 to 2.0.

13. A compressor according to claim 6, wherein
the pressure ratio ($R_L$) of the low-pressure compressor is within a range of 1.1 to 2.0.

14. A compressor according to claim 7, wherein
the pressure ratio ($R_L$) of the low-pressure compressor is within a range of 1.1 to 2.0.

15. A compressor according to claim 8, wherein
the pressure ratio ($R_L$) of the low-pressure compressor is within a range of 1.1 to 2.0.

16. A compressor according to claim 4, wherein
the pressure ratio ($R_F$) of the front fan is within a range of 1.2 to 2.5.

17. A compressor according to claim 11, wherein
the pressure ratio ($R_F$) of the front fan is within a range of 1.2 to 2.5.

18. A compressor according to claim 14, wherein
the pressure ratio ($R_F$) of the front fan is within a range of 1.2 to 2.5.

19. A compressor according to claim 15, wherein
the pressure ratio ($R_F$) of the front fan is within a range of 1.2 to 2.5.

20. A gas turbine engine comprising:
a front fan which rotates to compress intake air;
a single-stage low-pressure compressor which is disposed behind the front fan to compress intake air;
a sing-state high-pressure compressor which compresses the air compressed by the low-pressure compressor; wherein
a ratio ($R_H/R_L$) of a pressure ratio ($R_H$) of the high-pressure compressor to a pressure ratio ($R_L$) of the low-pressure compressor is within a range of 4.5 to 6.0;
a combustion chamber in which fuel is injected to the air compressed by the high-pressure compressor to provide combustion;
a high-pressure turbine which connects with the high-pressure compressor, and which is rotated by a combustion gas ejected from the combustion chamber;and
a low-pressure turbine which connects with the low-pressure compressor and the front fan, and which is rotated by the combustion gas ejected from the combustion chamber.

* * * * *